(12) United States Patent
Froelich et al.

(10) Patent No.: US 7,522,471 B2
(45) Date of Patent: *Apr. 21, 2009

(54) MULTIMODE ACOUSTIC IMAGING IN CASED WELLS

(75) Inventors: Benoit Froelich, Clamart Cedex (FR); Jean-Luc Le Calvez, Clamart Cedex (FR); Emmanuel Legendre, Clamart Cedex (FR); Smaine Zeroug, Clamart Cedex (FR)

(73) Assignee: Schlumberger Technology Corporation, Sugar Land, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/566,934

(22) PCT Filed: Aug. 2, 2004

(86) PCT No.: PCT/EP2004/008666

§ 371 (c)(1),
(2), (4) Date: Feb. 1, 2006

(87) PCT Pub. No.: WO2005/014975

PCT Pub. Date: Feb. 17, 2005

(65) Prior Publication Data
US 2006/0233048 A1    Oct. 19, 2006

(30) Foreign Application Priority Data
Aug. 8, 2003    (EP)    ................... 03291990

(51) Int. Cl.
*G01V 1/40* (2006.01)
*G01V 1/50* (2006.01)

(52) U.S. Cl. ........................................ 367/35; 181/105
(58) Field of Classification Search ................... 367/35; 181/105
See application file for complete search history.

(56) References Cited

U.S. PATENT DOCUMENTS

| 4,255,798 | A  |   | 3/1981  | Havira |
| 5,377,160 | A  | * | 12/1994 | Tello et al. .................... 367/35 |
| 5,924,499 | A  |   | 7/1999  | Birchak et al. |
| 7,149,146 | B2 | * | 12/2006 | Kuijk et al. .................... 367/35 |

FOREIGN PATENT DOCUMENTS

| EP | 1795919 A2 | * | 6/2007 |
| WO | WO99/35490 |   | 7/1999 |

* cited by examiner

*Primary Examiner*—Ian J Lobo
(74) *Attorney, Agent, or Firm*—Darla P. Fonseca; Jaime Castano; Dale Gaudier

(57) ABSTRACT

A well casing is insonified with a first acoustic wave in a first mode that may be any mode of a set including: extensional mode, thickness mode, flexural mode. A first echo is received at a first acoustic transducer for receiving, a first signal is produced and a first measurement is extracted from the first signal. The casing is then insonified with a second acoustic wave in a second mode that may be any mode of the set of modes but is distinct from the first mode. A second echo is received at a selected second acoustic transducer for receiving and a second signal is produced. A second measurement is extracted from the second signal. The zone behind the casing of the well is evaluated from a combination of the first measurement and the second measurement.

20 Claims, 13 Drawing Sheets

MULTIMODE ACOUSTIC IMAGING IN CASED WELLS

BACKGROUND OF INVENTION

1. Field of the Invention

The invention relates generally to a method and apparatus for acoustical imaging of cased wells.

2. Background Art

In a well completion, a casing or pipe is set in a wellbore, and a fill-material, typically cement, is forced into an annulus between the casing and a formation. The primary purpose of such cement is to separate oil- and gas-producing layers from each other, and from water-bearing strata.

FIG. 1 shows a schematic diagram of a cased well. The cased well generally includes a number of interfaces $12_1$, $12_2$, $12_3$ at junctures of differing materials within a wellbore 11. A "first interface" $12_1$ exists at the juncture of a borehole fluid 13 in a casing 14 and the casing 14. The casing 14 is typically made of steel. A "second interface" $12_2$ is formed between the casing 14 and an annulus 15 behind the casing 14. If cement 112 is properly placed in the annulus 15, the "second interface" $12_2$ exists between the casing 14 and the cement 112. A "third interface" $12_3$ exists between the annulus 15 and a formation 16. The formation 16 may comprise a plurality of layers, e.g., an oil-producing layer 17, a gas-producing layer 18 and a water-bearing layer 19.

A micro-annulus 111 may appear at the second interface $12_2$, between the casing 14 and the cement 112. A forming of the micro-annulus 111 is due to a variation of pressure inside the casing 14. Even if the micro-annulus 111 is present, the layers 17, 18, 19 may be properly sealed off by the cement 112.

However, if a void 113 appears between the casing and the formation, the cement may fail to provide isolation of one layer 17, 18, 19 from another. Fluids, e.g., oil, gas or water, under pressure may migrate from one layer 17, 18, 19 to another through the void 113, and create a hazardous condition or reduce production efficiency. In particular, migration of water into the oil-producing layer 17 may, in some circumstances, render a well non-exploitable. Also, migration of oil into the water-bearing layer 19 is environmentally and economically undesirable. Thus, imaging the annulus content, and, in particular, detecting the third interface $12_3$ between the annulus 15 and the formation 16, may be important for reliable determination of the hydraulic isolation of the different layers of a formation.

Another need for through-the-casing imaging exists in the process of hydraulic fracturing, which typically takes place after a well has been cased, and is used to stimulate the well for production. Often, the fracturing process is accompanied by sanding, whereby certain strata of the formation release fine sand that flows through casing perforations into the well, and then up to the surface, where it can damage production equipment. This problem can be remedied if the sand-producing zones are detected as could be done, for example, with an imaging technology capable of operating through the casing.

Various cement evaluating techniques using acoustic energy have been used in prior art to investigate a description of a zone behind a thick casing wall with a tool located inside the casing 14.

First Cement Evaluation Technique from Prior Art

FIG. 2 contains a schematic diagram of a first cement evaluation technique involving acoustic waves having an extensional mode inside a casing 24. The first cement evaluation technique is described in U.S. Pat. No. 3,401,773, to Synott, et al. A logging tool 21 comprising a conventional, longitudinally spaced sonic transducer for transmitting 22 and transducer for receiving 23 is used to investigate a well 28. Both transducers operate in the frequency range between roughly 20 kHz and 50 kHz. A fill-material 25 isolates the casing 24 from a formation 26. The logging tool 21 is suspended inside the casing 24 with a cable 27.

The sonic transducer for transmitting 22 insonifies the casing 24 with an acoustic wave 27 that propagates along the casing 24 as an extensional mode whose characteristics are determined primarily by the cylindrical geometry of the casing and its elastic wave properties. A refracted wave 29 is received by the transducer for receiving 23 and transformed into a received signal The received signal is processed to extract a portion of the signal affected by the presence or absence of cement 25 behind the casing 24. The extracted portion is then analyzed to provide a measurement of its energy, as an indication of the presence or absence of cement outside the casing 24. If a solid, e.g., cement, is in contact with the casing 24, the amplitude of the acoustic wave 211 propagating as an extensional mode along the casing 24 is partially diminished; consequently, the energy of the extracted portion of the received signal is relatively small. On the contrary, if a liquid, e.g., mud, is in contact with the casing 24, the amplitude of the acoustic wave 211 propagating as an extensional mode along the casing 24 is much less diminished; consequently, the energy of the extracted portion of the received signal is relatively high. A state, e.g., liquid or solid, of the matter behind the casing 24 is thus evaluated from the value of the energy received. This technique provides useful information about the presence or absence of the cement next to the second interface 210 between the casing 24 and the annulus.

However, the first cement evaluation technique uses low frequency sonic waves (20 to 50 kHz). Those acquainted with acoustic theory in general and sonic borehole in particular will recognize that this casing extensional mode involves vibrations of the entire cylindrical structure of the casing 24. As a consequence, there is no azimuthal resolution. The results may be plotted in a curve as a function of depth only.

Second Cement Evaluation Technique from Prior Art

FIG. 3 contains a schematic diagram of a second cement evaluation technique for investigating the quality of a cement bond between a casing 32 and an annulus 38 in a borehole 39 formed in a formation 310. The second cement evaluation technique is described in U.S. Pat. No. 2,538,114 to Mason and U.S. Pat. No. 4,255,798 to Havira. The measurement is based on an ultrasonic pulse echo technique, whereby a single transducer 31 mounted on a logging tool 37, insonifies the casing 32 at near-normal incidence, and receives reflected echoes 33.

The transducer 31 insonifies the casing 32 with an acoustic wave 34 having a frequency selected to stimulate a selected radial segment of the casing 32 into a thickness resonance. A portion of the acoustic wave is transferred into the casing and reverberates between a first interface 311 and a second interface 35. The first interface 311 exists at the juncture of a borehole fluid in a casing 32 and the casing 32. The second interface 35 is formed between the casing 32 and the annulus 38 behind the casing 32. A further portion of the acoustic wave is lost in the annulus 38 at each reflection at the second interface 35, resulting in a loss of energy for the acoustic wave. The acoustic wave losses more or less energy depending on the state of the matter 312 behind the casing 32.

Reflections at the first interface 311 and second interface 35, give rise to a reflected wave 33 that is transmitted to the transducer 31. A received signal corresponding to the reflected wave 33 has a decaying amplitude with time. This signal is processed to extract a measurement of the amplitude decay rate. From the amplitude decay rate, a value of the acoustic impedance of the matter behind the casing 32 is calculated. The value of the impedance of water is near 1,5 MRayl, whereas the value of impedance of cement is typically higher (for example this impedance is near 8 MRayl for a class G cement). If the calculated impedance is below a predefined threshold, it is considered that the matter is water or mud. And if the calculated impedance is above the predefined threshold, it is considered that the matter is cement, and that the quality of the bond between cement and casing is satisfactory.

The second cement evaluation technique uses ultrasonic waves (200 to 600 kHz). Those acquainted with acoustic theory in general will recognize that the excited casing thickness mode involves vibrations of the segment of the casing confined to an azimuthal range. The second cement evaluation technique thus provides spatial resolution as opposed to the first cement evaluation technique.

The values of the impedance may be plotted in a map as a function of a depth and an azimuthal angle. The depth and the azimuthal angle may be plotted respectively on a first and a second axis. The value of the impedance may be represented by a color.

However, the first cement evaluation technique and the second cement evaluation technique provide information predominantly on the state of the matter located at the second interface 35 only.

U.S. Pat. No. 5,763,773 to Birchak et al. discloses a multi-part logging apparatus consisting of pulse-echo and pitch-catch transducers to probe the cement outside of a casing. A pitch-catch system refers to the use of separate transmitting and receiving transducers whose alignment angle with respect to the normal to the casing is different from zero (i.e., non-normal incidence). The disclosure teaches one to align all pitch-catch transducers at angles, with respect to the normal of the casing inner wall, that are less than a shear wave critical angle of a first interface between the casing and a fluid, e.g., oil or gas, therein. Additionally, a method to evaluate the quality of a cement seal is disclosed. This method relies on quantifying the attenuation of the propagating energy between transducers.

Third Cement Evaluation Technique from Prior Art

A third cement evaluation technique is described in U.S. Pat. No. 6,483,777 to Zeroug. FIG. 4 provides an illustration of the third cement evaluation technique. A logging tool 41 comprising an acoustic transducer for transmitting 42 and an acoustic transducer for receiving 43 mounted therein is used to investigate a well 411. The transducer for transmitting 42 and the transducer for receiving 43 are aligned at an angle θ. The angle θ is measured with respect to the normal to the local interior wall of the casing N. The angle θ is larger than a shear wave critical angle of a first interface 46 between a casing 44 and a fluid 47, e.g., oil or gas, therein. Hence, the transducer for transmitting 42 excites a flexural wave A in the casing 44 by insonifying the casing 44 with an excitation aligned at the angle θ greater than the shear wave critical angle of the first interface 46.

The flexural wave A propagates inside the casing 44 and sheds energy to the fluid 47 inside the casing 44 and to the fill-material 45 behind the casing 44. A portion B of the flexural wave propagates within an annulus 410 and may be refracted backward at a third interface 412. An echo 49 is recorded by the transducer for receiving 43. A measurement of a propagation time may be extracted from a signal at an output of the transducer for receiving 43 corresponding to the echo 49.

A velocity of the wave within the annulus 410 may be calculated from the propagation time, provided that the thickness of the annulus 410 is known. The velocity of the wave depends on a nature of the acoustic wave within the annulus, which depends itself on the quality of the fill-material.

If an additional transducer for receiving (not represented on the figure) is provided at a location on the logging tool above the acoustic transducer for receiving 43, an additional signal may be produced at an output of the additional transducer for receiving. A flexural wave attenuation, may be extracted from the signal and from an additional signal. The flexural wave attenuation depends on the quality of the fill-material within the annulus 410.

The quality of the cement behind the casing 44 may be evaluated from the velocity of the wave within the annulus 410 and/or the flexural wave attenuation. The quality, e.g., a state of the matter, may be plotted in a map as a function of depth and azimuthal angle.

Since the portion B of the flexural wave propagates within the annulus 410, the corresponding signal provides information about the entire matter within the annulus 410, i.e., over an entire distance separating the casing 44 and the third interface 42.

SUMMARY OF INVENTION

In a first aspect the invention provides a method for imaging a description of a zone behind a casing of a well, the method using a logging tool positionable inside the casing, the logging tool carrying a plurality of acoustic transducers, the method comprising insonifying the casing with a first acoustic wave using a first acoustic transducer for transmitting among the plurality of acoustic transducers, the first acoustic wave having a first mode that may be any mode of a set of modes defined as follows: extensional mode, thickness mode, flexural mode. At least a first acoustic transducer for receiving is selected among the plurality of transducers, the first acoustic transducer for receiving having a location adapted to receive a first echo corresponding to the first acoustic wave. The first echo is received at the first acoustic transducer for receiving, and a first signal is produced. A first measurement is extracted from the first signal. The method further comprises insonifying the casing with a second acoustic wave using a second transducer for transmitting among the plurality of transducers, the second acoustic wave having a second mode that may be any mode of the set of modes. The second mode is distinct from the first mode. At least a second acoustic transducer for receiving is selected among the plurality of transducers, the second acoustic transducer for receiving having a location adapted to receive a second echo corresponding to the second acoustic wave. The second echo is received at the second acoustic transducer for receiving and a second signal is produced. A second measurement is extracted from the second signal. The description of the zone behind the casing of the well is evaluated from a combination of the first measurement and the second measurement.

In a first preferred embodiment, the description of the zone behind the casing is characterized by a quality of a fill-material disposed in an annulus between the casing and a formation.

In a second preferred embodiment, the first mode is a flexural mode and the second mode is a thickness mode;

In a third preferred embodiment, the first measurement is a measurement of a propagation time and the second measurement is a measurement of an amplitude decay rate with time.

In a fourth preferred embodiment, a value of an impedance of the matter within the annulus and a value of a velocity of a compressional wave within the annulus are calculated from the measurement of the propagation time and the measurement of the amplitude decay rate. A value of a density of the matter within the annulus is evaluated from the calculated value of the acoustic impedance and the calculated value of the compressional wave velocity.

In a fifth preferred embodiment, an additional acoustic transducer for receiving is selected among the plurality of acoustic transducers. The additional acoustic transducer for receiving is distinct from the first acoustic transducer for receiving. The additional acoustic transducer for receiving has a location adapted to receive an additional echo corresponding to the first acoustic wave. The additional echo is received at the additional acoustic transducer for receiving and an additional signal is produced. A measurement of a first amplitude is extracted from the first signal and a measurement of an additional amplitude is extracted from the additional signal.

In a sixth preferred embodiment, a plurality of observed parameters are calculated at least from the measurement of the propagation time and the measurement of the amplitude decay rate. A set of quality events of the matter within the annulus is defined. For each quality event, an a posteriori probability of the quality event for the calculated values of the observed parameters is calculated. The most probable quality event is selected.

In a seventh preferred embodiment, a plurality of quality parameters are estimated from the selected quality event and from the calculated values of the observed parameters.

In an eighth preferred embodiment, the plurality of observed parameters comprises an impedance of the matter within the annulus, an apparent velocity of the first acoustic wave and a flexural wave attenuation of the first acoustic wave along the casing. The plurality of the quality parameters comprises a density of the matter within the annulus, a shear wave velocity of the first acoustic wave through the matter and a compressional wave velocity of the first acoustic wave through the matter.

In a ninth preferred embodiment, the first mode is a flexural mode and the second mode is an extensional mode;

In a tenth preferred embodiment, the casing is insonified with a third acoustic wave using a third acoustic transducer for transmitting among the plurality of acoustic transducers, the third acoustic wave having a third mode, the third mode being distinct from the first mode and the second mode. A third acoustic transducer for receiving is selected, the first transducer for receiving having a location adapted to receive a third echo corresponding to the third acoustic wave. The third echo is received at the third acoustic transducer and a third signal is produced. A third measurement is extracted from the third signal. The description of the zone behind the casing of the well is evaluated from a combination of the first measurement, the second measurement and the third measurement.

Preferably the fill-material is cement.

In an eleventh preferred embodiment, the logging tool is guided and rotated inside the casing in order to evaluate the description of the zone behind the casing within a range of depths and azimuthal angles.

In a second aspect the invention provides a system for imaging a composition of a zone behind a casing of a well, the system comprising a logging tool positionable inside the casing and carrying a plurality of acoustic transducers. The system further comprises a first acoustic transducer for transmitting among the plurality of acoustic transducers to insonify the casing with a first acoustic wave having a first mode that may be any mode of a set of modes defined as follow: extensional mode, thickness mode, flexural mode. The system further comprises a second acoustic transducer for transmitting among the plurality of acoustic transducers to insonify the casing with a second acoustic wave having a second mode that may be any mode of the set of modes and is distinct from the first mode. The system further comprises at least a first acoustic transducer for receiving among the plurality of acoustic transducers. The first acoustic transducer for receiving has a location adapted to receive a first echo corresponding to the first acoustic wave. The first acoustic transducer for receiving produces a first signal. The system further comprises at least a second acoustic transducer for receiving among the plurality of acoustic transducers having a location adapted to receive a second echo corresponding to the second acoustic wave. The second acoustic transducer for receiving produces a second signal. The system further comprises extracting means to extract a first measurement and a second measurement respectively from the first signal and the second signal. The system further comprises processing means to evaluate a quality of the composition of the zone behind the casing from a combination of the first measurement and the second measurement.

In a twelfth preferred embodiment; the first acoustic transducer for transmitting and the first acoustic transducer for receiving are aligned at an angle larger than a shear wave critical angle of an interface between the casing and a fluid within the casing, the angle being measured with respect to a normal to the local interior wall of the casing.

In a thirteenth preferred embodiment, the second acoustic transducer for transmitting is directed to the normal to the local interior wall of the casing. The second acoustic transducer for transmitting has a frequency spectrum selected to stimulate a selected radial segment of the casing into a thickness resonance.

In a fourteenth preferred embodiment, the system further comprises an additional acoustic transducer for receiving among the plurality of acoustic transducers having a location adapted to receive an additional acoustic wave corresponding to the first acoustic wave. The additional acoustic transducer for receiving is distinct from the first acoustic transducer for receiving. The additional acoustic transducer for receiving produces an additional signal.

In a fifteenth preferred embodiment the system further comprises an array of transducers elements located on a periphery of the logging tool to insonify the casing at least with the first acoustic wave and the second acoustic wave propagating within the casing with respectively the first mode and the second mode.

Other aspects and advantages of the invention will be apparent from the following description and the appended claims.

DETAILED DESCRIPTION

General Overview

Each one of the cement evaluation techniques from prior art provides one or more measurements with a relatively high uncertainty. Errors may appear when the state of the fill-material within the annulus is evaluated from the measurement.

Figure 1:
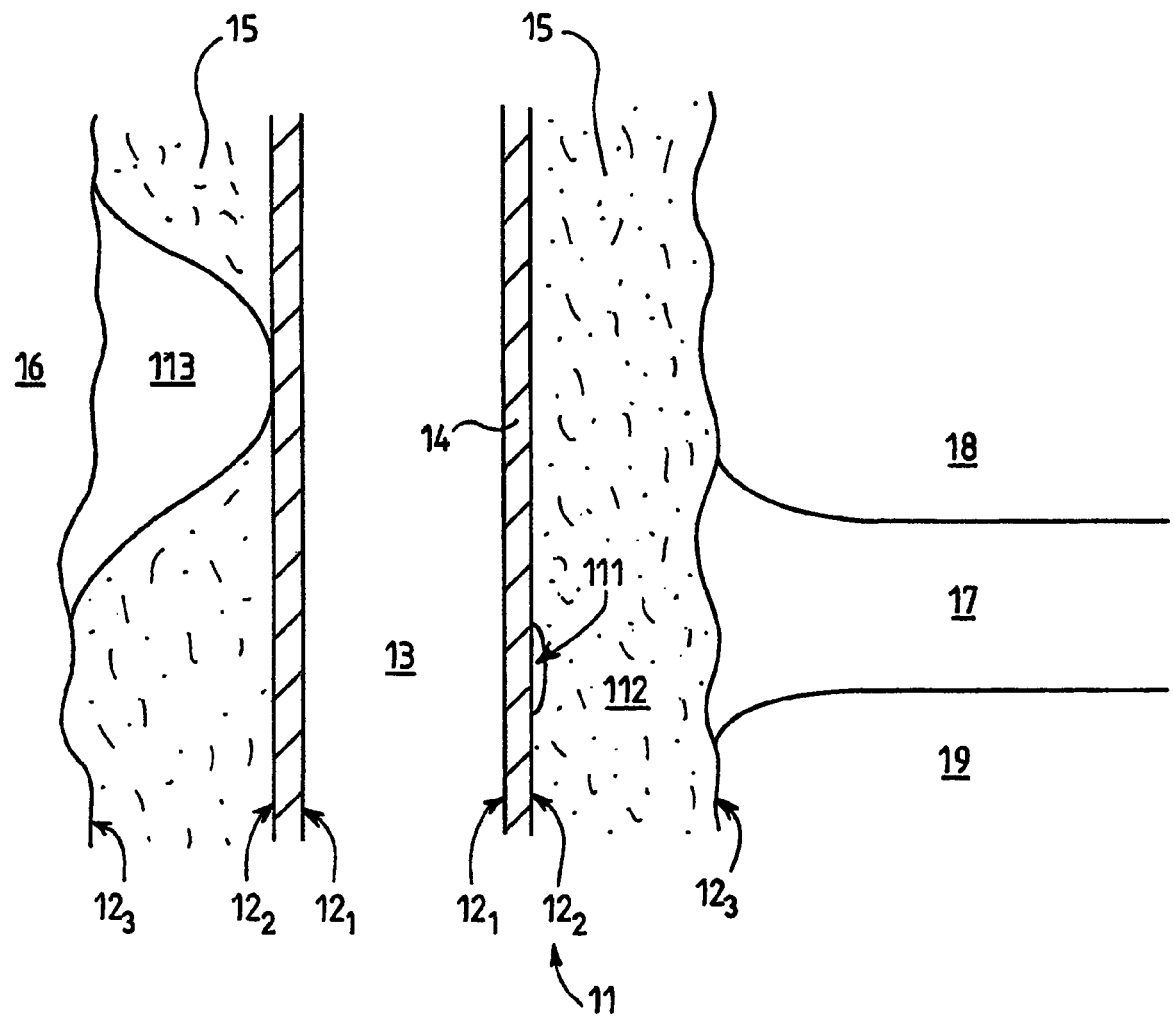
FIG. 1 contains a schematic diagram of a cased well from Prior Art.
Figure 2:
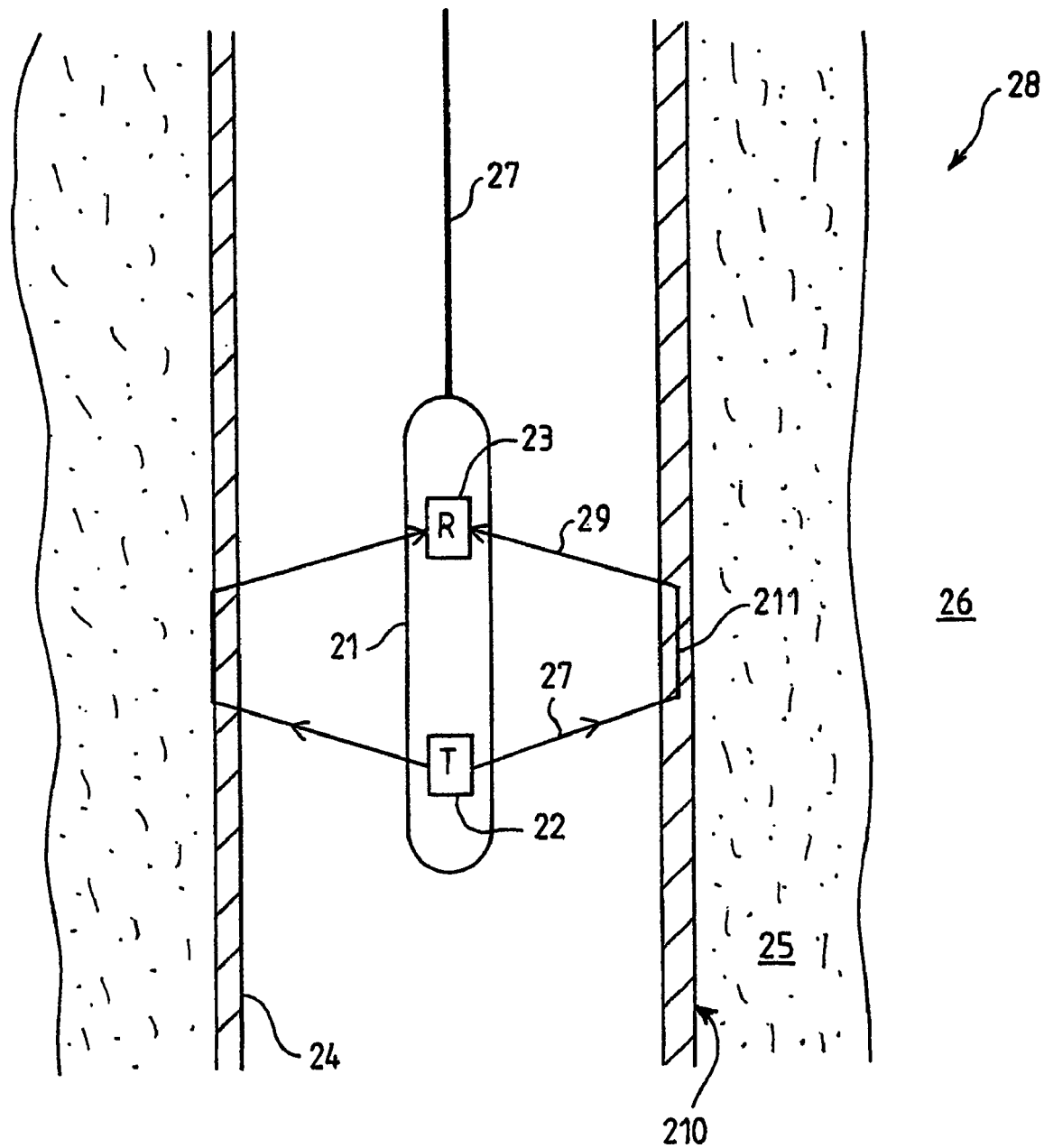
FIG. 2 contains a schematic diagram of a first cement evaluation technique from Prior Art.
Figure 3:
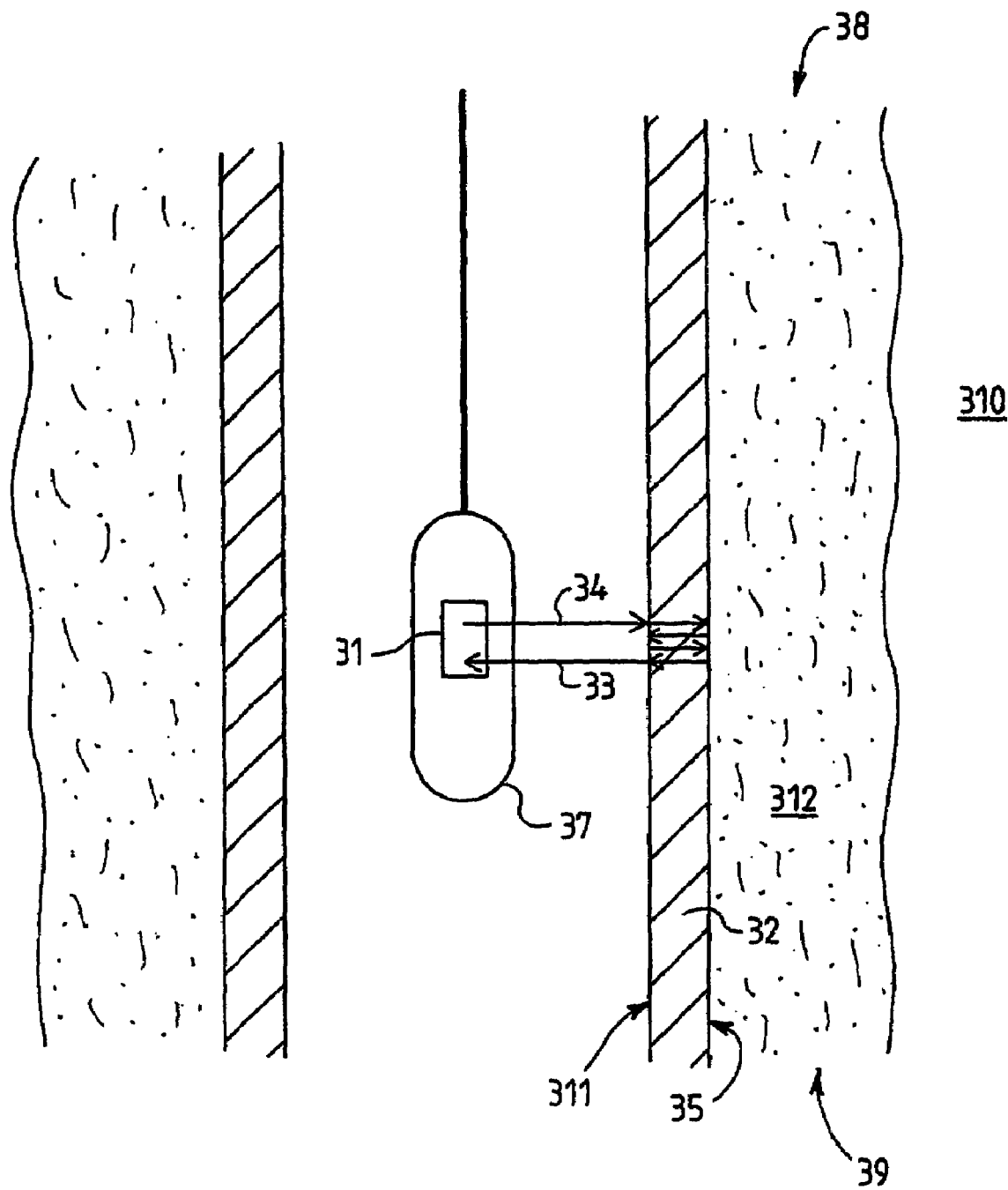
FIG. 3 contains a schematic diagram of a second cement evaluation technique from Prior Art.
Figure 4:
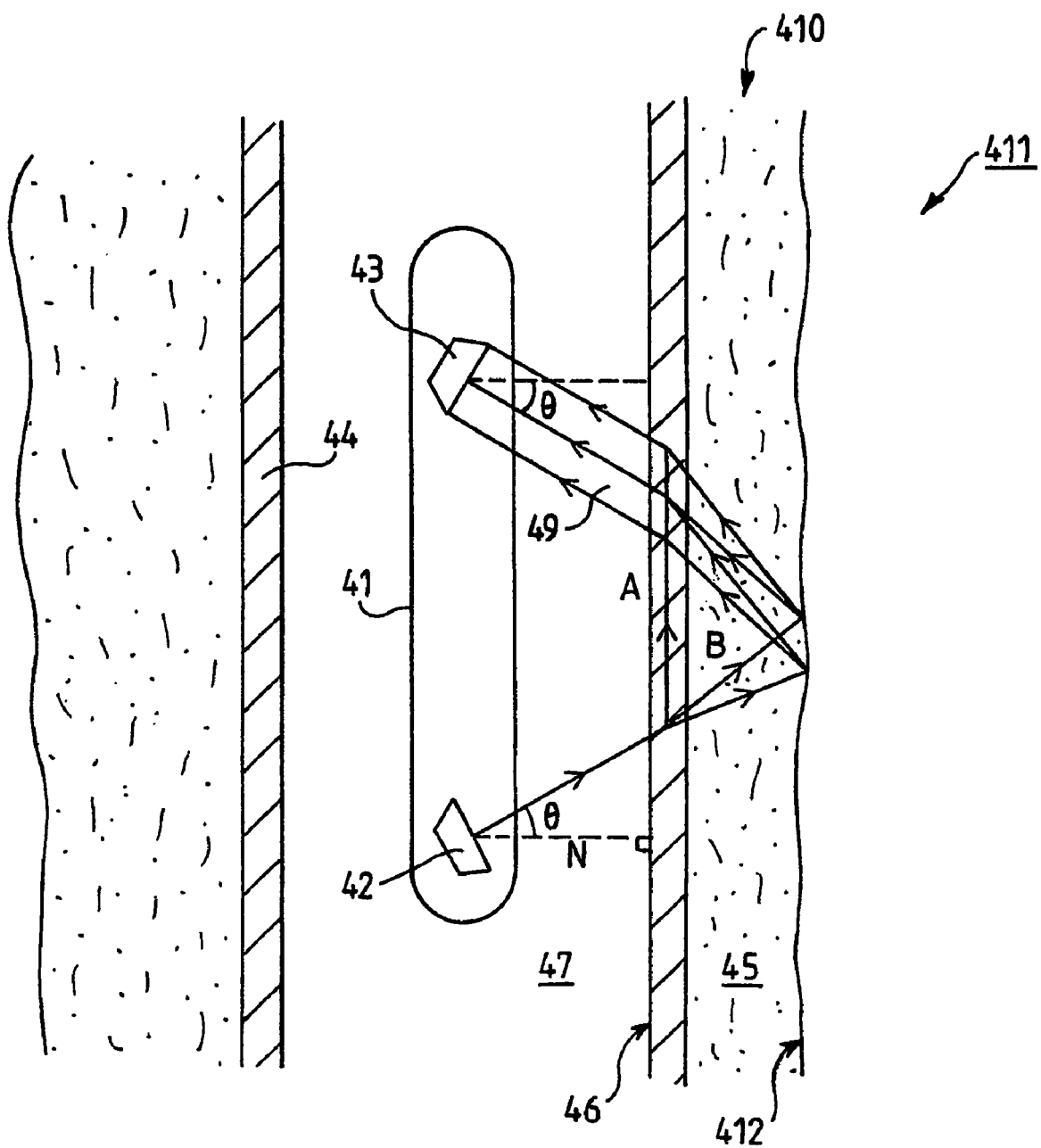
FIG. 4 contains a schematic diagram of a third cement evaluation technique from Prior Art.
Figure 5A:
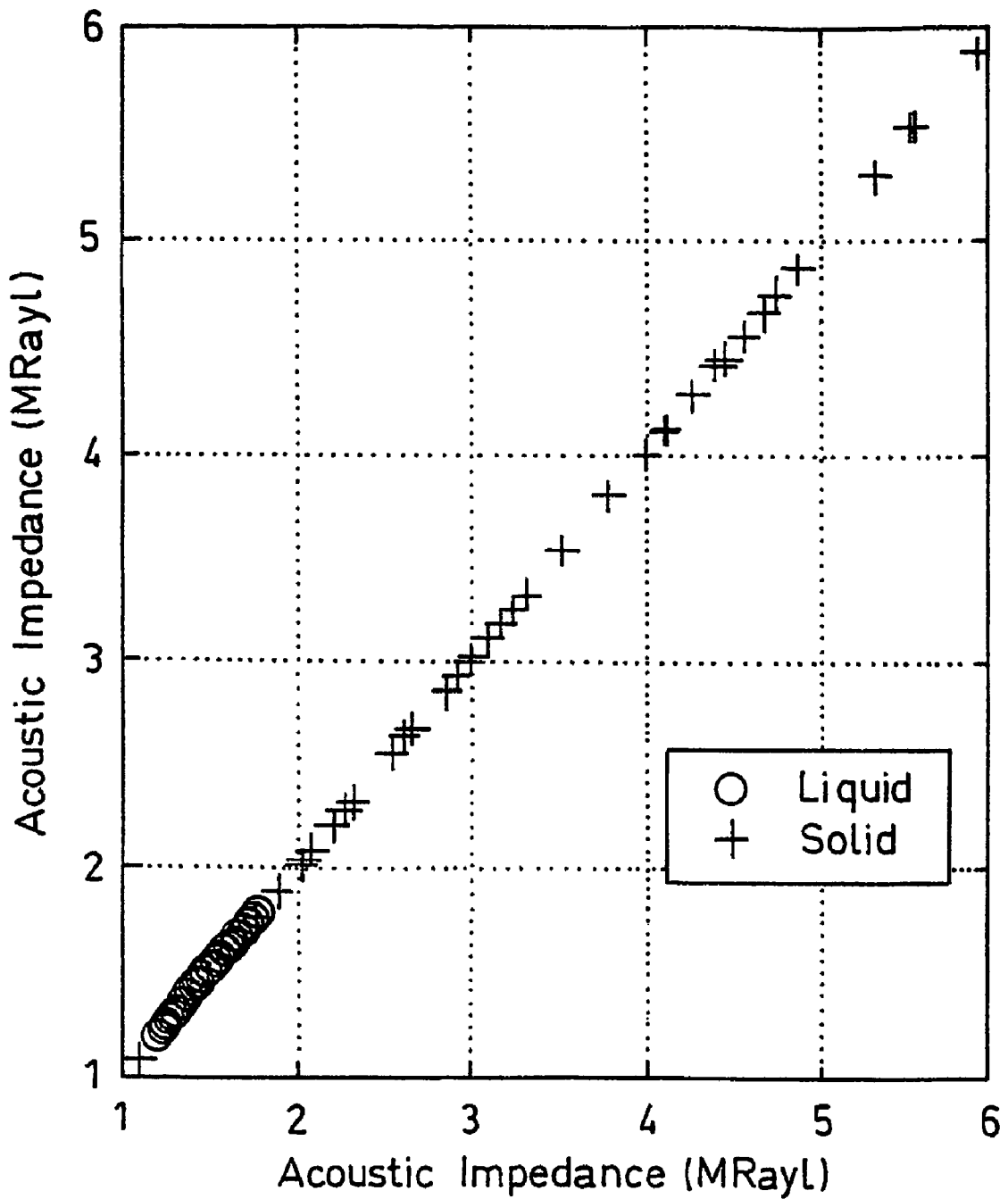
FIG. 5A shows a graph of simulated measurements of acoustic impedance according to a second cement evaluation technique from Prior Art.

FIG. 5A shows a graph of simulated acoustic impedance values according to the second cement evaluation technique from prior art. A plurality of sets of characteristics corresponding to a plurality of matters is provided. For a determined set of characteristics, a value of acoustic impedance is calculated. A plurality of values of acoustic impedance is thus plotted in the graph of FIG. 5A. For a determined set of characteristics corresponding to a matter in a fluid state, a circle is plotted. For a determined set of characteristics corresponding to a matter in a solid state, a cross is plotted.

It may be observed in the graph of FIG. 5A that a set of characteristics of a matter in a solid state may provide a substantially low value of acoustic impedance, e.g. between 1 MRayl and 2 MRayl. These values are located with a same range of values as a plurality of values of acoustic impedance provided for the matters in a liquid state. Estimating the state of a matter from a determined value of a corresponding calculated impedance may generate errors.

Figure 5B:
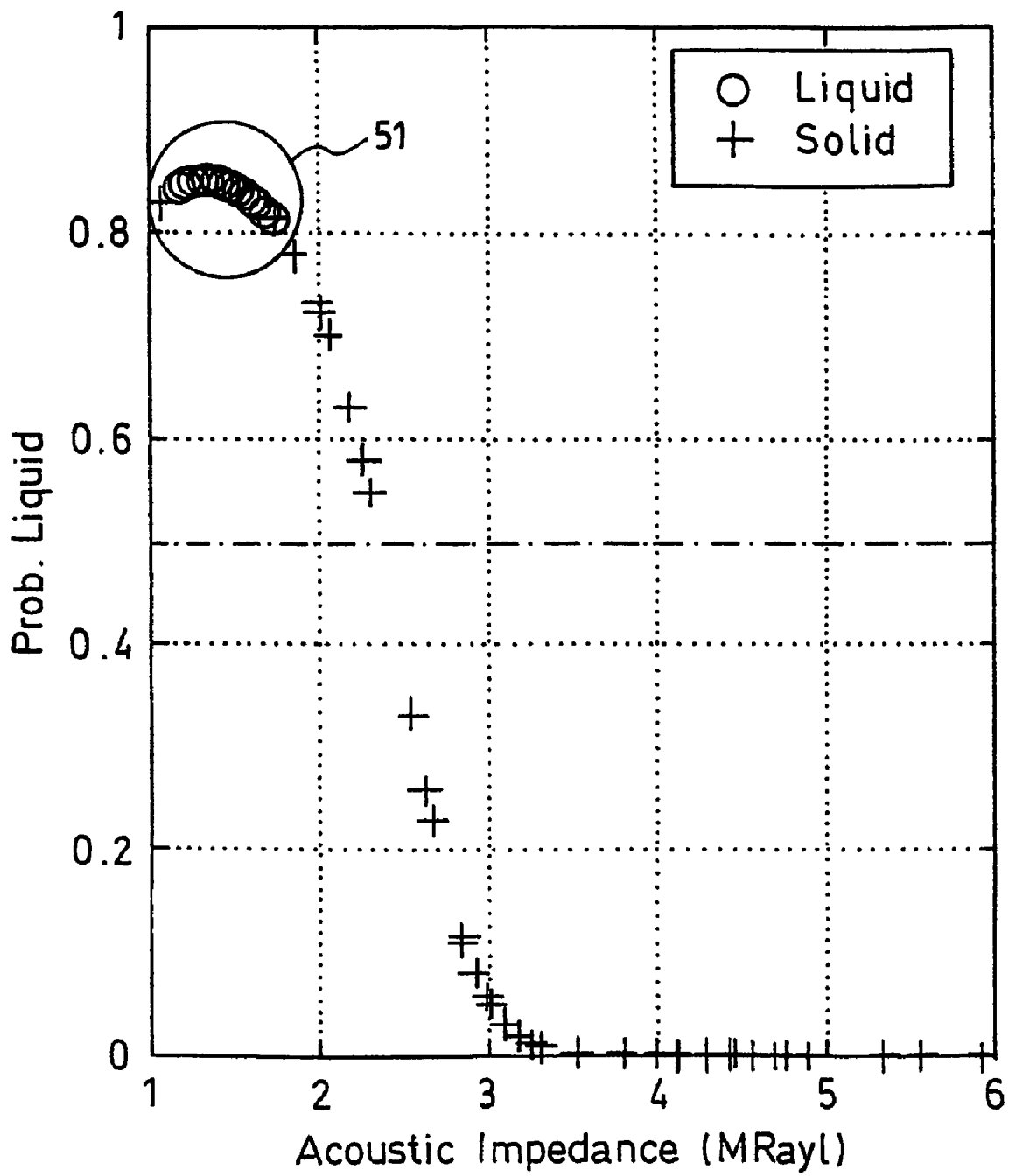
FIG. 5B shows a graph of simulated evaluation of a state of a matter according to a second cement evaluation technique from Prior Art.

FIG. 5B shows a graph of simulated evaluation of a state from the second cement evaluation technique. For a determined set of characteristics corresponding to a determined matter, a corresponding value of acoustic impedance is calculated as in FIG. 5A. A probability of the matter to be in a liquid state is evaluated from the corresponding calculated value of acoustic impedance. A plurality of probabilities to be in a liquid state is plotted as a function of the simulated acoustic impedance. For a determined set of characteristics of a determined matter in a fluid state, a circle is plotted. For a determined set of characteristics of a determined matter in a solid state, a cross is plotted.

It may be observed from the graph of FIG. 5B that a set of characteristics corresponding to a matter in a solid state may provide a probability to be in a liquid state higher than 0,5. Furthermore, a set of characteristics corresponding to a matter in a solid state and a set of characteristics corresponding to a matter in a liquid state may have very close simulated probabilities to be in a liquid state. A mixed zone 51 may be defined, the mixed zone comprising plots corresponding to a matter in a liquid state and a plurality of plots corresponding to a matter in a solid state. Evaluating the state of a determined matter having a corresponding plot within the mixed zone may not be reliable.

Figure 6A:
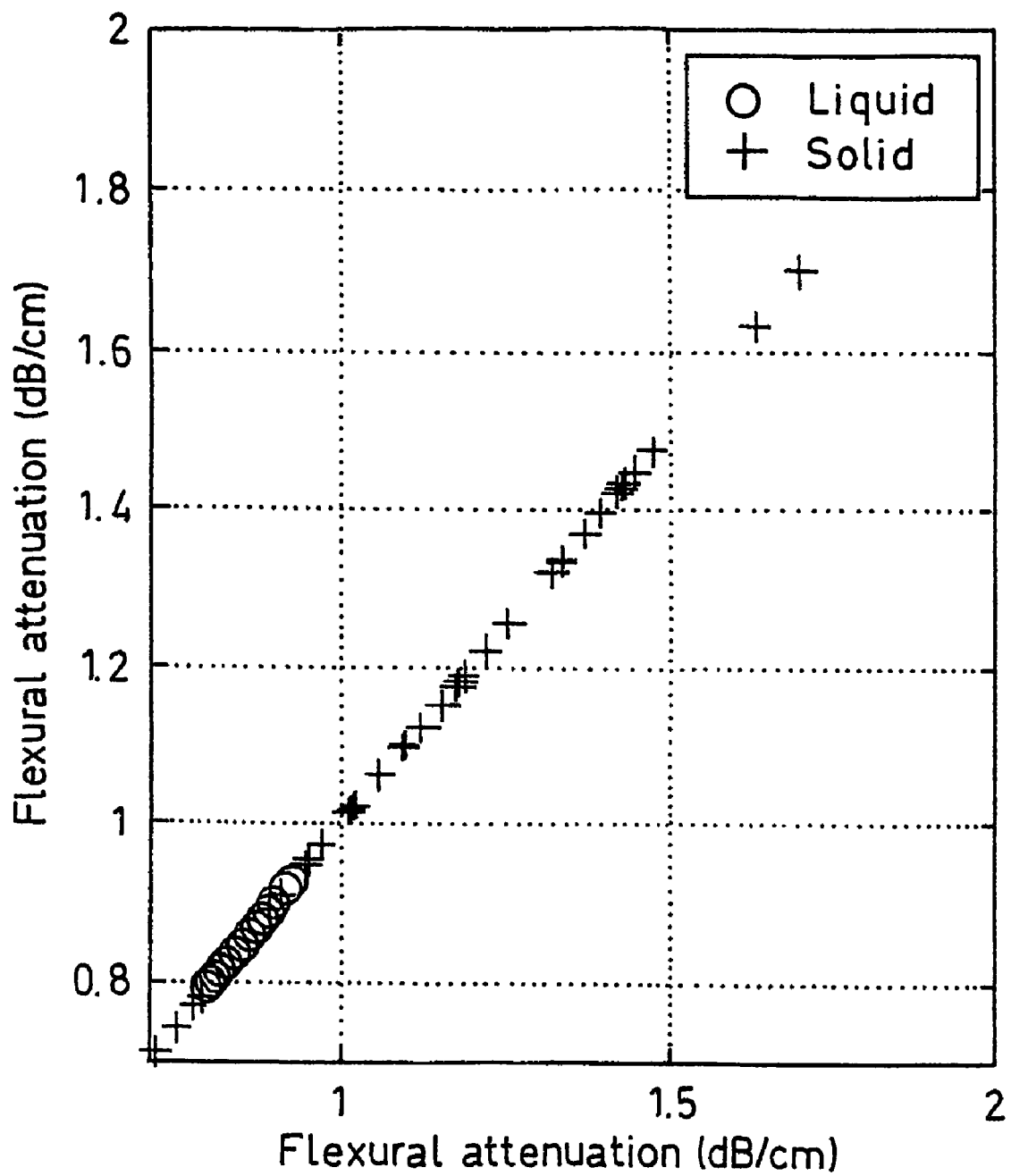
FIG. 6A shows a graph of simulated measurements of acoustic impedance according to a third cement evaluation technique from Prior Art.

FIG. 6A shows a graph of simulated flexural wave attenuation values according to the third cement evaluation technique from prior art. A plurality of values of flexural wave attenuation is calculated from a plurality of sets of characteristics corresponding to a plurality of matters. The plurality of values of flexural wave attenuation is plotted on the graph of FIG. 6A. For a determined set of characteristics corresponding to a determined matter in a fluid state, a circle is plotted. For a determined set of characteristics corresponding to a determined matter in a solid state, a cross is plotted.

Similarly, it may be observed in the graph of FIG. 6A that a set of characteristics corresponding to a matter in a solid state may provide a substantially low value of flexural wave attenuation, e.g., below 1 dB/cm, similar to the attenuation of a liquid. Estimating the state of a determined matter from the value of the corresponding simulated flexural wave attenuation may generate errors.

Figure 6B:
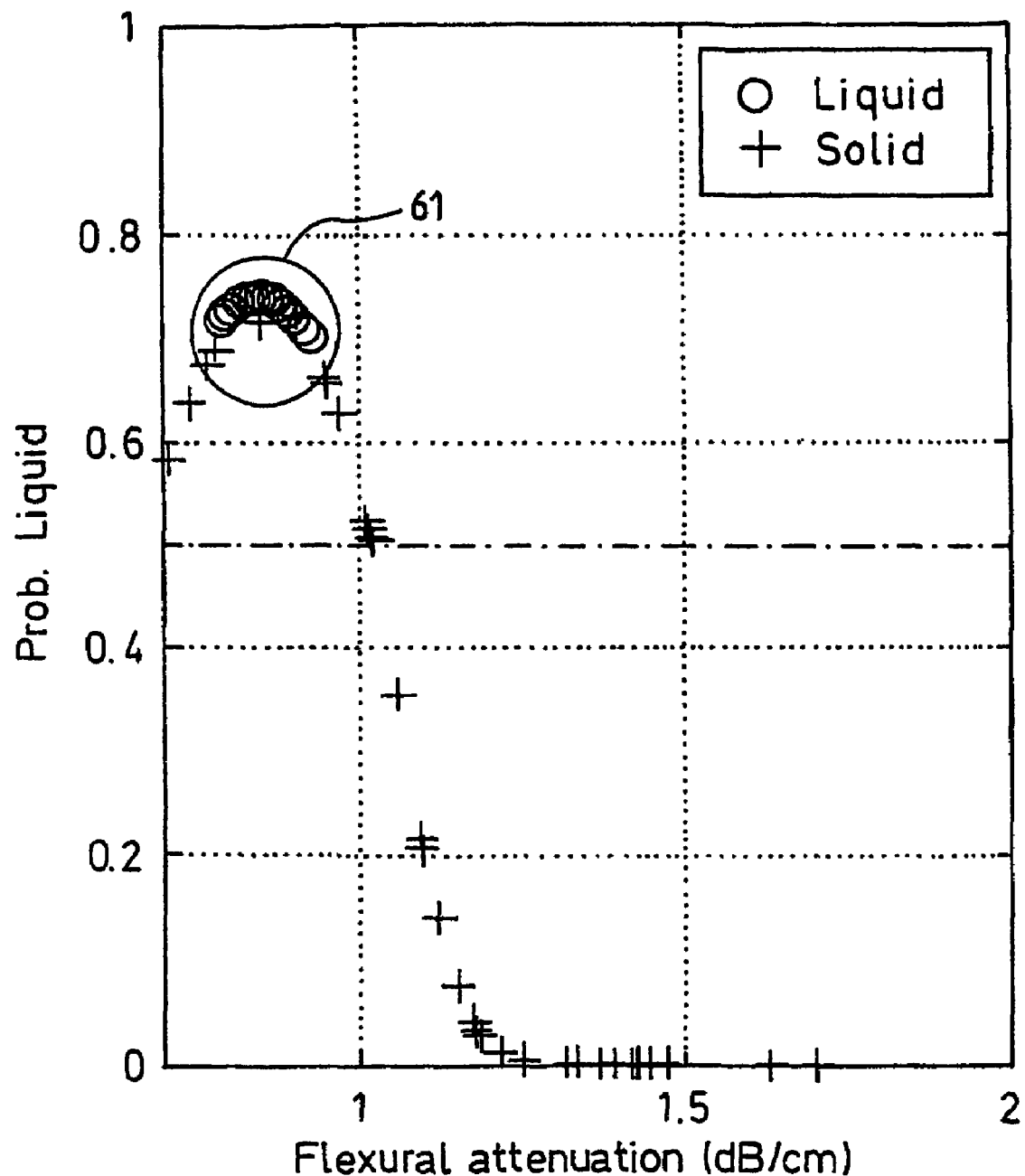
FIG. 6B shows a graph of simulated evaluation of a state of a matter according to a third cement evaluation technique from Prior Art.

FIG. 6B shows a plot of a plurality of values of a probability to be in a liquid state. For a determined set of characteristics, the value the probability to be in a liquid state is evaluated from a corresponding value of a flexural wave attenuation. For a determined set of characteristics of a determined matter in a fluid state, a circle is plotted. For a determined set of characteristics of a determined matter in a solid state, a cross is plotted.

It may be observed that a set of characteristics corresponding to a matter in a solid state may have probabilities to be in a liquid state higher than 0.5. A mixed zone 61 may be defined, the mixed zone comprising plots corresponding to a matter in a liquid state and a plurality of plots corresponding to a matter in a solid state. Evaluating the state of a determined matter having a corresponding plot within the mixed zone may not be reliable.

Furthermore, a new cement having a lower density than conventional cements has been developed and is increasingly being used to fill the annulus behind the casing. As a consequence of the lower density, the new cement has a relatively low acoustic impedance that may be substantially equal to 3 MRayl. This value of the acoustic impedance is relatively close to the value of the acoustic impedance of the water. The uncertainty related to the acoustic impedance in the first cement evaluation technique and the second cement evaluation technique is such that the evaluation of the state of the matter may be even less reliable than if conventional cement with an impedance of 8 MRayl is used.

The invention provides a method and an apparatus for improving the reliability of the evaluation of a description of a zone behind the casing.

Figure 7:
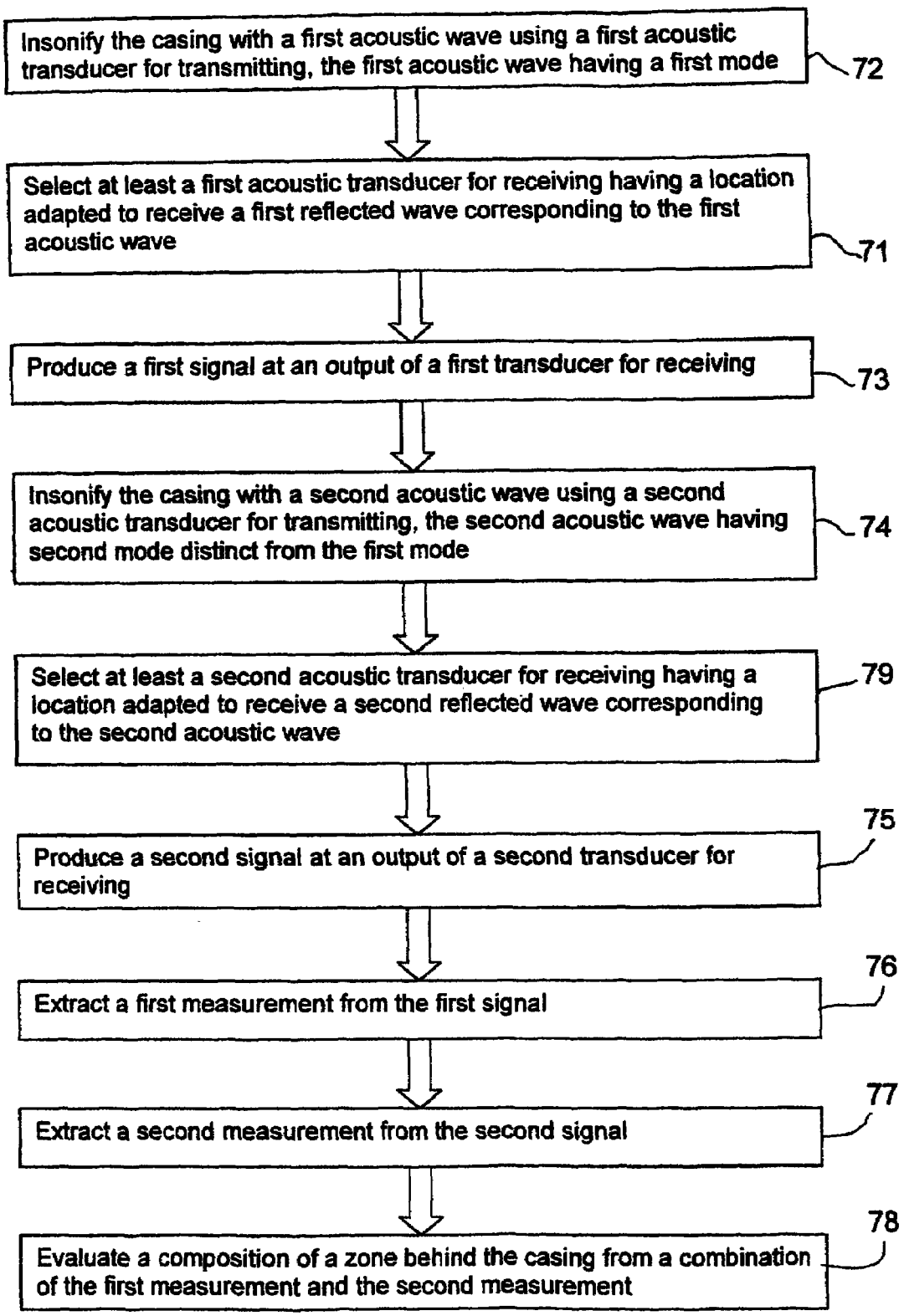
FIG. 7 provides a flowchart of an example method for imaging an annulus content according to the present invention.

FIG. 7 provides a flowchart of an example method for imaging a description of a zone behind a casing of a well according to the present invention. The method uses a logging tool positionable inside the casing of the well. The logging tool carries a plurality of acoustic transducers. A first acoustic transducer for transmitting among the plurality of transducers insonifies 72 the casing with a first acoustic wave. The first acoustic wave is emitted with a predetermined frequency and a predetermined angle with respect to a normal of the casing, in order to propagate inside the casing with a first mode. The first mode may be any mode among a set of modes defined as follows: extensional mode, thickness mode, flexural mode. At least a first acoustic transducer for receiving is selected 71 among the plurality of transducers. The first acoustic transducer for receiving has a location adapted to receive a first echo corresponding to the first acoustic wave. The first acoustic transducer for receiving records 73 the first echo and produces at an output a first signal.

The signal at the output of the first acoustic transducer for receiving is an electric signal having an amplitude that is a function of an acoustic amplitude of the echo seen by the first acoustic transducer for receiving.

A second acoustic transducer for transmitting among the plurality of transducers insonifies 74 the casing with a second acoustic wave. The second acoustic wave is emitted with a predetermined frequency and a predetermined angle with respect to a normal of the casing, in order to propagate inside the casing with a second mode that may be any mode of the set of modes. The second mode is distinct from the first mode. At least a second acoustic transducer for receiving is selected 79. The second acoustic transducer for receiving has a location adapted to receive a second echo corresponding to the second acoustic wave. The second acoustic transducer for receiving receives the second echo and produces 75 at an output a second signal corresponding to the second acoustic wave.

The first signal and the second signal are analyzed: a first measurement is extracted 76 from the first signal and a second measurement is extracted from the second signal 77.

A description of the zone behind the casing is evaluated 78 from a combination of the first measurement and the second measurement. The description of the zone may be characterized by a quality of a fill-material, e.g., cement, disposed in an annulus. The quality of the fill-material depends on a state of a matter within the annulus: if the matter is a fluid state, the cement may comprise a void or a leak.

In the methods according to prior art, the quality of the fill-material is evaluated from only a single measurement, or from a plurality of measurements that are extracted from a single signal corresponding to a single wave. The method according to the present invention provides a more reliable evaluation of the state of the matter within the annulus, since a single evaluation is performed from a plurality of measurements that are derived from a plurality of acoustic waves.

Figure 8A:
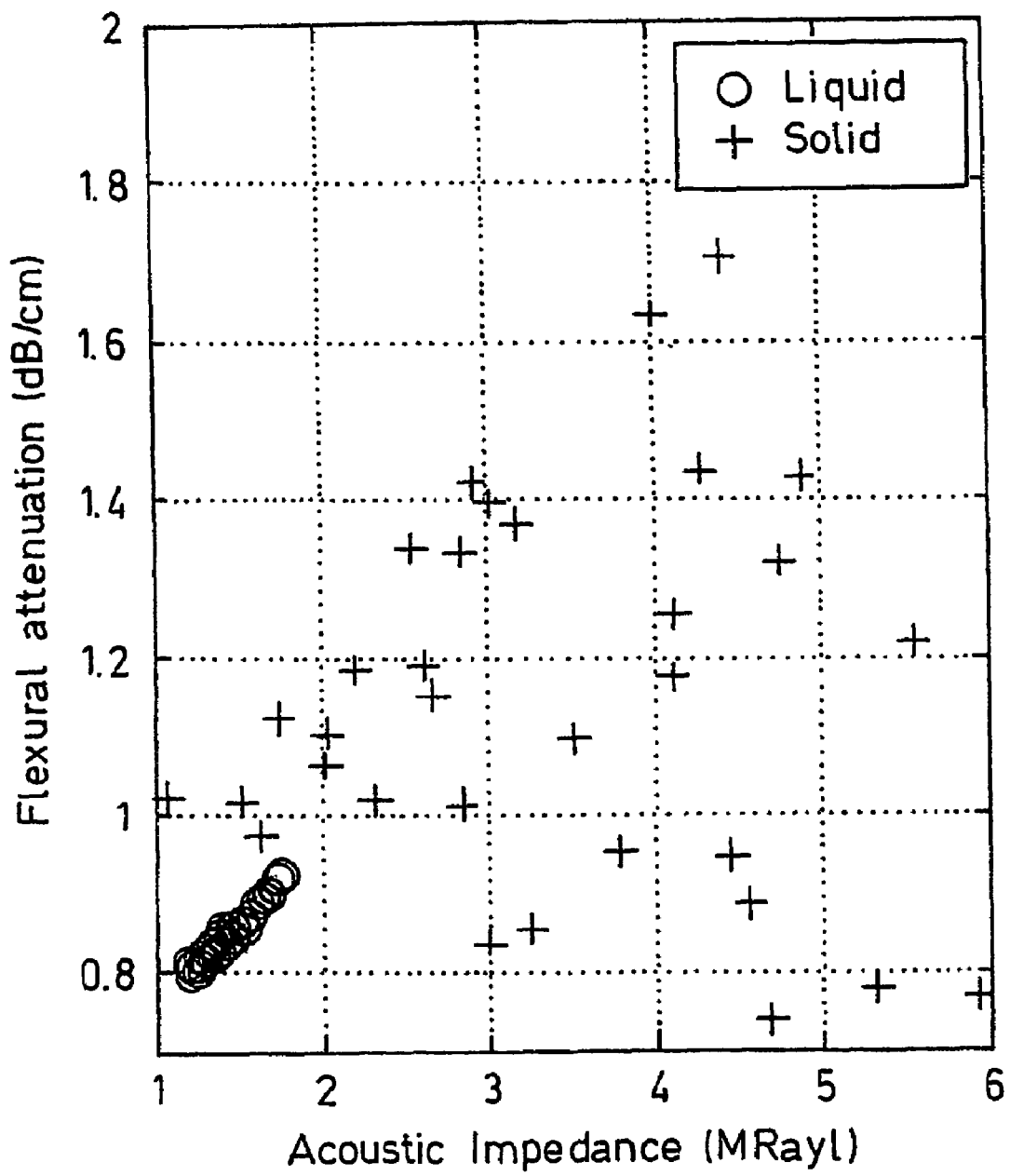
FIG. 8A shows a graph of simulated measurements of acoustic impedance as a function of simulated measurements of flexural wave attenuation according to the invention.

FIG. 8A shows a graph of simulated flexural wave attenuation values as a function of simulated acoustic impedance values according to the present invention. A plurality of sets of characteristics corresponding to a plurality of matters is provided. For each set of characteristics, the simulated value of the flexural wave attenuation is plotted as a function of the corresponding simulated value of the acoustic impedance. For a determined set of characteristics corresponding to a matter in a fluid state, a circle is plotted. For a determined set of characteristics corresponding to a matter in a solid state, a cross is plotted.

Comparing to the graphs of FIG. 5A and FIG. 6A, it may be observed that plots corresponding to a matter in a liquid state are much more separated from plots corresponding to a matter in a solid state than in the graphs from prior art.

Figure 8B:
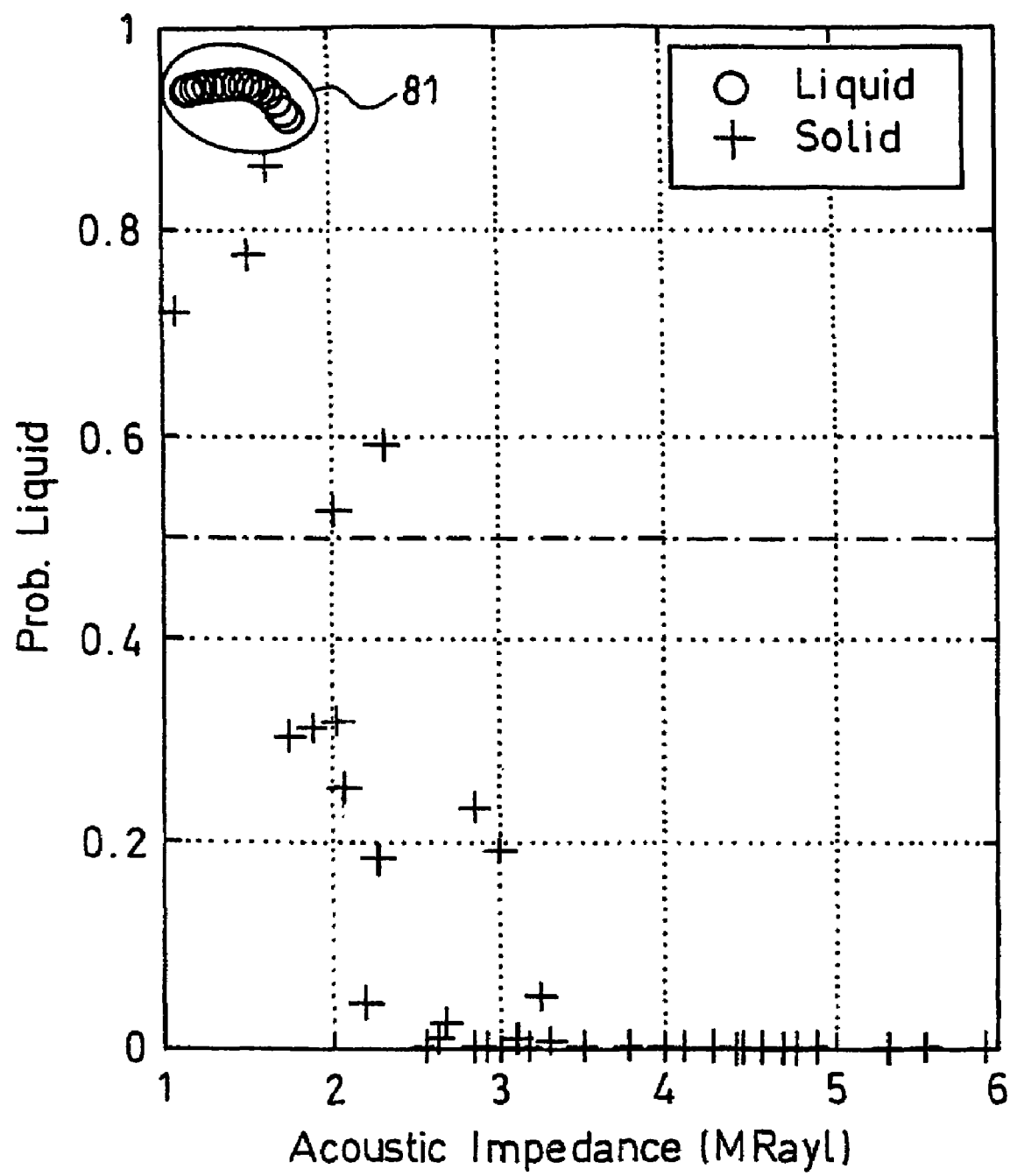
FIG. 8B shows a graph of simulated evaluation of a state according to the invention.

FIG. 8B shows a graph of evaluated probabilities to be in a liquid state simulated from the sets of characteristics of FIG. 8A. For each set of characteristics, a probability for the corresponding matter to be in a liquid state is evaluated from the corresponding simulated value of the flexural wave attenuation and the corresponding, simulated value of the acoustic impedance. For a determined set of characteristics corresponding to a matter in a fluid state, a circle is plotted. For a determined set of characteristics corresponding to a matter in a solid state, a cross is plotted.

Comparing to the graphs of FIG. 5B and FIG. 6B, it may be observed that only a few plots corresponding to a matter in a solid state exhibits a probability of being liquid larger than 0.5. Furthermore, the plots corresponding to a matter in a liquid state are much more isolated from the plots corresponding to a matter in a solid state than in the graphs from prior art. A liquid state zone 81 may be defined, the liquid state zone comprising only plots corresponding to matters in a liquid state. Estimating a state of a matter behind a casing is thus more reliable with the method of the present invention than with the methods from prior art.

First Example Embodiment

Figure 9:
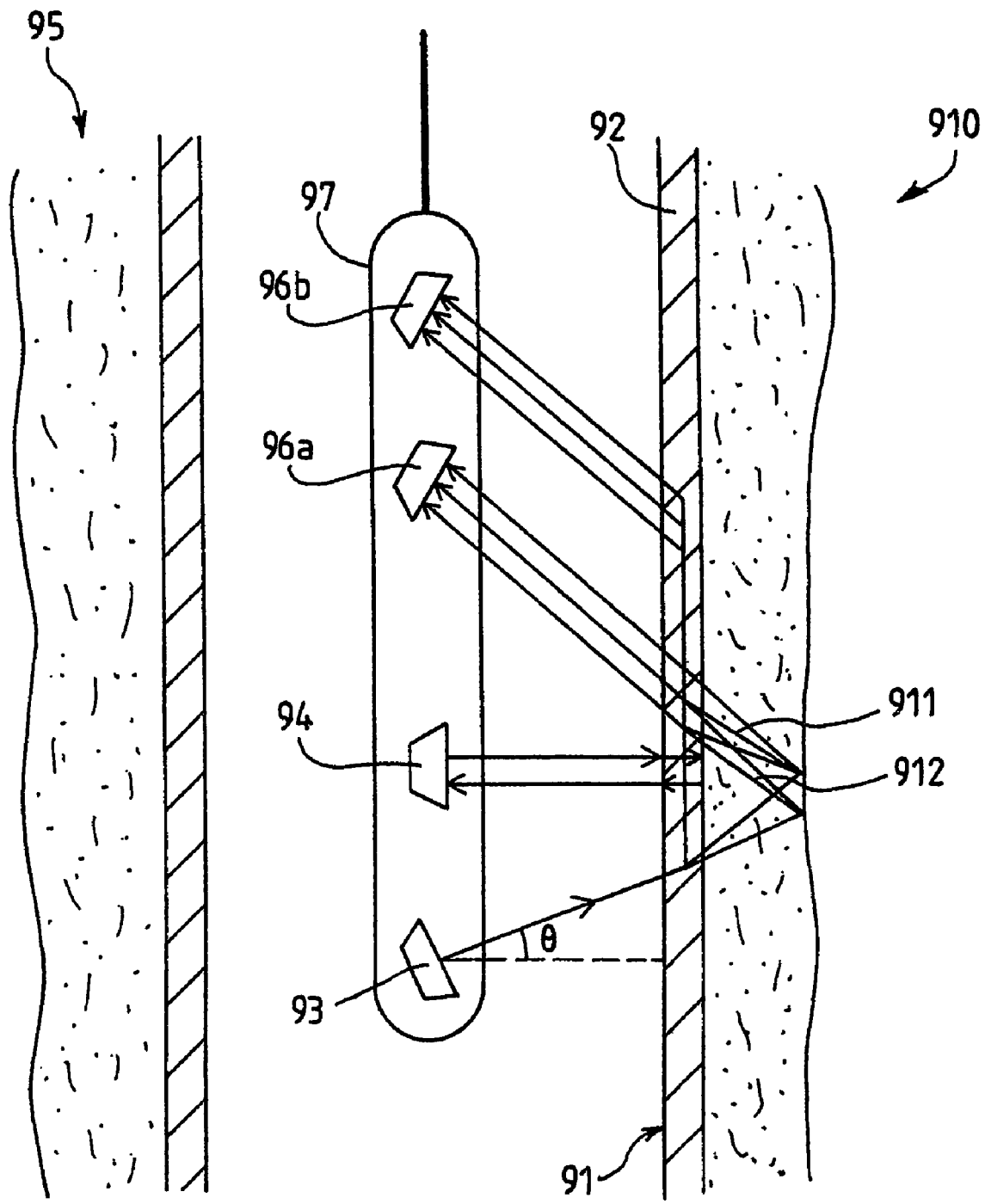
FIG. 9 contains an illustration of an example apparatus according to the present invention.

FIG. 9 contains an illustration of an example apparatus according to the present invention. A description of a zone behind a casing 92 is evaluated by estimating a quality of a fill-material within an annulus between the casing 92 and a formation. A logging tool 97 is provided inside the casing 92 of a well 910. The logging tool 97 comprises a first transducer for transmitting 93 and a second transducer for transmitting 94.

The logging tool may be moved along a vertical axis inside the casing, and may be rotated around the vertical axis, thus providing an evaluation of the description of the zone behind the casing within a range of depths and azimuthal angles.

The first transducer for transmitting 93 insonifies the casing 92 with a first acoustic wave. In this example embodiment, the first acoustic wave is emitted with an angle θ relative to a normal of the casing 92 greater than a shear wave critical angle of the first interface 91. Hence the first acoustic wave propagates within the casing 92 predominantly as a flexural mode. A portion of the energy of the first acoustic wave is transmitted to the annulus 95. A further portion of the energy is refracted inside the casing 92.

A first transducer for receiving 96a and an additional transducer for receiving 96b respectively receive a first echo and respectively produce a first signal and an additional signal corresponding to the first acoustic wave. The first transducer for receiving 96a and the additional transducer for receiving 96b may be located on a vertical axis on the logging tool 97.

Following the first acoustic wave, the second transducer for transmitting 94 insonifies the casing 92 with a second acoustic wave. In this example embodiment, the second transducer for transmitting 94 may be used as a second transducer for receiving 94. The second transducer for transmitting 94 is substantially directed to a normal of the casing 92, and the second acoustic wave has a frequency selected to stimulate a selected radial segment of the casing 92 into a thickness resonance.

The second transducer for receiving 94 receives a second echo corresponding to the second acoustic wave.

In a first alternative embodiment, the second transducer for transmitting may insonify the casing with a second acoustic wave having an extensional mode, or any mode distinct from the first mode.

In a second alternative embodiment, the first and the second acoustic waves are transmitted simultaneously respectively from the first and the second transducer for transmitting. The first transducer for receiving records a first raw signal. The first raw signal may be represented as a sum of a first signal and a second signal respectively corresponding to the first acoustic wave and the second acoustic wave. The first raw signal is processed in order to separate the first signal from the second signal. In the second alternative embodiment, the first transducer for receiving may be used as the second transducer for receiving. The first signal and the second signal are extracted from a single first raw signal recorded at a single first transducer for receiving.

In a third alternative embodiment, the first acoustic wave and the second acoustic wave are transmitted simultaneously respectively from the first and the second transducer for transmitting. The first transducer for receiving is distinct from the second transducer for receiving. The first transducer for receiving and the second transducer for receiving record respectively a first and a second raw signal. Both the first and the second raw signal may be represented as a weighted sum of a first and a second received signals respectively corresponding to the first and the second acoustic waves. Both the first and the second raw signal are processed in order to separate the first and the second received signal. The processing thus provides four signals: a separated first signal from the first transducer for receiving, a separated second signal from the first transducer for receiving, a separated first signal from the second transducer for receiving and a separated second signal from the second transducer for receiving. A first signal is created from the values of the separated first signal from the first transducer for receiving and the separated first signal from the second transducer for receiving. Similarly, a second signal is created from the values of the separated second signal from the first transducer for receiving and the separated second signal from the second transducer for receiving. The third alternative embodiment provides a more reliable evaluation of the first and the second signals than the second alternative embodiment.

In a fourth alternative embodiment, a third transducer for transmitting and a third transducer for receiving are provided at two distinct locations along an axis of a logging tool. The third transducer for transmitting insonifies the casing with a third acoustic wave. The third acoustic wave propagates with a third mode, e.g., an extensional mode, the third mode being distinct from the first mode and the second mode. The third transducer for receiving produces a third signal corresponding to a third echo from the third acoustic wave. A third measurement is extracted from the third signal. The quality of the fill-material is evaluated from a combination of the first measurement, the second measurement and the third measurements.

In a fifth alternative embodiment, a casing is insonified with at least four waves, each wave having a distinct mode. A plurality of acoustic transducers is provided at a plurality of locations on a logging tool, each location depending on a corresponding mode. At least four measurements are extracted from four signals corresponding respectively to the four waves. The quality of the fill-material is evaluated from a combination of the four measurements.

Processing Step

The first signal and the second signal are recorded and analyzed. Processing means extract a first measurement and a second measurement respectively from the first signal and the second signal. A plurality of observed parameters is calculated from the first measurement and the second measurement.

In this example embodiment, the second measurement may be a value of an amplitude decay rate of the second signal. The value of the amplitude decay rate provides a value of an acoustic impedance of a matter within the annulus 95.

A measurement of an additional amplitude is extracted in this embodiment from the additional signal, and a measurement of a first amplitude is extracted from the first signal. A value of a flexural wave attenuation of the first acoustic wave along the casing 92 is calculated from the measurement of the additional amplitude and the measurement of the first amplitude.

The first measurement may be a value of a propagation time. The value of the propagation time enables to calculate a value of an apparent velocity of the wave within the annulus.

The apparent velocity may be a shear wave velocity, a compressional wave velocity, or a mix velocity of the two types of waves. If the annulus 95 is filled with gas, no detectable acoustic wave may propagate within gas. If the annulus 95 is filled with a liquid, e.g., water or mud, only a compressional wave may propagate within the fluid. In the measurement based on flexural mode, if the annulus 95 is filled with high density cement, only a shear wave may propagate through the cement matter. If the annulus 95 is filled with cement having a low density, both the shear wave and the compressional wave may propagate through the cement matter.

The apparent velocity may be a mix velocity only in this latter case. The mix velocity corresponds to a mix of a shear-compressional wave 912 and a compressional-shear wave 911. The shear-compressional wave 912 propagates forward with a shear mode and backward with a compressional mode. The compressional-shear wave 911 propagates forward with a compressional mode and backward with a shear mode. The shear-compressional wave 912 and the compressional-shear wave 911 may reach the first transducer for receiving simultaneously generating a single component of the signal. Hence a single velocity $v_{pssp}$ may be measured.

For a solid matter such as cement, the compressional wave velocity is in general substantially higher than the shear wave velocity. For example, the compressional wave velocity is substantially equal to 3300 m/s, whereas the shear wave velocity is substantially equal to 1800 m/s. A nature of the apparent velocity (shear, compressional or mix) may be evaluated directly from the value of the apparent velocity. In this latter case, the quality of the fill-material may be evaluated by estimating a state of the matter within the annulus (solid or liquid).

Evaluation Step

In the embodiment shown in FIG. 9, the quality of the fill-material is evaluated by estimating both the state of the matter within the annulus and the nature of the apparent velocity. No decision is made about the nature of the apparent velocity before the estimation of the quality of the fill-material within the annulus. If the matter within the annulus is in a fluid state, only a compressional wave may propagate. A set of quality events comprising four quality events is thus considered:

(a) The matter within the annulus is in a fluid state and the apparent velocity is a compressional wave velocity;

(b) The matter within the annulus is in a solid state and the apparent velocity is a compressional wave velocity;

(c) The matter within the annulus is in a solid state and the apparent velocity is a shear wave velocity;

(d) The matter within the annulus is in a solid state and the apparent velocity is a mix velocity.

No gas state is considered since the acoustic waves do not practically propagate through gas.

The quality of the fill-material within the annulus 95 is evaluated from the calculated values of both the flexural wave attenuation and the acoustic impedance.

In this example embodiment, a probability density function of the observed parameters, (the flexural wave attenuation and the acoustic impedance) knowing the quality event may be approximated analytically from know-how of cementing. Hence a posteriori probabilities of each quality event having measured the observed impedance and the observed flexural wave attenuation may be evaluated using for example a method known as Baye's rule, or any other method.

When the probabilities of each quality event are evaluated, a decision is made concerning the state of the matter within the annulus 95 and the nature of the apparent velocity, according to the evaluated a posteriori probabilities.

A last step in this embodiment consists in estimating a plurality of quality parameters, e.g., the density $\rho$, the shear wave velocity $v_s$ and the compressional wave velocity $v_p$, from the evaluated state, the observed acoustic impedance, the observed flexural wave attenuation and from the apparent velocity $v_a$.

In another embodiment, Neural Networks for example may be used to obtain at least one quality parameter, e.g., a nature of an apparent velocity of a wave through the annulus 95, from the extracted measurements.

Second Example Embodiment

Figure 10:
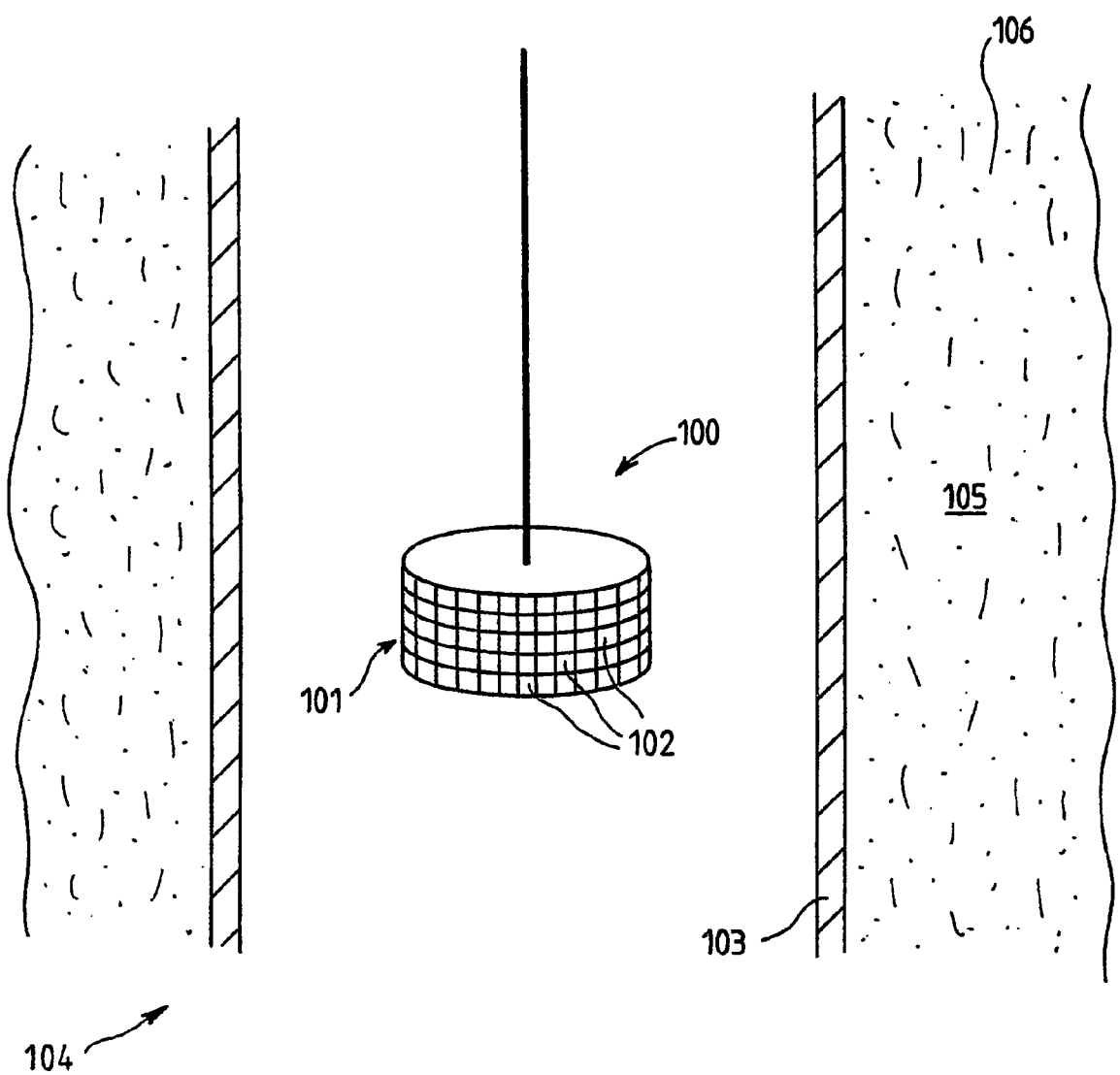
FIG. 10 illustrates a second example embodiment of the present invention.

FIG. 10 illustrates a second example embodiment of the present invention. In this example embodiment, a logging tool 100 comprises an array 101 of transducer elements 102. Each transducer element 102 is able to transmit a signal according to an instruction from a circuit (not represented). By applying delays on the transmitted signals, a steering in a predetermined direction may be possible. At least one first transducer element for transmitting insonifies a casing 103 of a well 104 with a first acoustic wave having a predetermined angle relative to the normal of the casing. The first acoustic wave thus propagates within the casing with a first mode. The first mode may be one of the following modes: extensional, flexural and thickness mode. At least one first transducer element for receiving among the array 101 of transducer elements 102 records a first signal corresponding to the first acoustic wave.

Similarly, following the recording of the first signal, a second acoustic wave is emitted by at least one second transducer element for transmitting of the array 101 of transducer elements 102. A direction of the second acoustic wave is determined according to the delays on transmitted signals. The second acoustic wave thus propagates within the casing 103 with a second mode. The second mode is distinct from the first mode. At least one second transducer element for receiving among the array 101 of transducer elements 102 records a second signal corresponding to the second acoustic wave.

The first and the second signals are then processed to extract respectively a first measurement and a second measurement.

A quality of a matter 105 within an annulus 106 surrounding the casing 103, such as a state of the matter 105, is evaluated from a combination of the first measurement and the second measurement.

The array of transducers does not need to be rotated inside the casing to provide an evaluating of the description of the zone surrounding the casing. By electronically selecting the transducer elements for transmitting along the array circumference, the ultrasonic beam is electronically rotated.

In another alternative embodiment, the quality parameter may be a density of a matter within the annulus. A first measurement is extracted from a first received signal. The first measurement may provide a value of the acoustic impedance of the matter. Similarly, a second measurement may provide a value of a velocity of a wave through the annulus. A value of the density may be evaluated from a combination of the value of the acoustic impedance and the value of the velocity. The value of the density may be evaluated as being equal to a ratio of the value of the acoustic impedance and the value of the velocity.

The measurement may be any data extracted from at least one signal, that when combined to another measurement, may be used to provide an evaluation of the description of the zone behind the casing of the well, e.g., the amplitude of a peak of the signal, a propagation time etc.

The observed parameters may be any parameter that may be calculated from at least one measurement, e.g. the impedance of the matter within the annulus, the apparent velocity, the flexural attenuation etc.

The quality event may be any event enabling to evaluate the description of the zone behind the casing. Typically, the quality event is the state of the matter within the annulus (solid, liquid or gas). The quality event may also comprise the nature of the apparent velocity (shear, compressional or mix).

The quality parameters may be any parameter characterizing an outside of the casing, such as a shear wave velocity of an acoustic wave behind the casing, a density of the matter behind the casing etc.

The description of the zone behind the casing may be any characteristic of the outside of the casing. The description of the zone behind the casing comprises the quality of the fill-material. Typically, the quality of the fill-material depends on the state of the matter within the annulus. However, the quality of the fill-material may be characterized by any quality parameter providing information about an isolating capacity of the matter within the casing, such as the acoustic impedance or the density of the matter within the casing. The description of the zone behind the casing may also be characterized by any parameter providing information about a layer or a sand-producing zone.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

The invention claimed is:

1. A method for imaging a description of a zone behind a casing of a well, the method using a logging tool positionable inside the casing, the logging tool carrying a plurality of acoustic transducers, the method comprising:
    a. insonifying (72) the casing with a first acoustic wave using a first acoustic transducer for transmitting among the plurality of acoustic transducers, the first acoustic wave having a first mode that may be any mode of a set of modes defined as follows: extensional mode, thickness mode, flexural mode;
    b. selecting (71) at least a first acoustic transducer for receiving among the plurality of transducers, the first acoustic transducer for receiving having a location adapted to receive a first echo corresponding to the first acoustic wave;
    c. receiving (73) at the first acoustic transducer for receiving the first echo, and producing a first signal;
    d. extracting (76) from the first signal a first measurement;
    e. insonifying (74) the casing with a second acoustic wave using a second transducer for transmitting among the plurality of acoustic transducers, the second acoustic wave having a second mode that may be any mode of the set of modes and is distinct from the first mode;
    f. selecting (79) at least a second acoustic transducer for receiving among the plurality of transducers, the second acoustic transducer for receiving having a location adapted to receive a second echo corresponding to the second acoustic wave;

g. receiving (75) at the second acoustic transducer for receiving the second echo and producing a second signal;
h. extracting (77) from the second signal a second measurement;
i. evaluating (78) from a combination of the first measurement and the second measurement the description of the zone behind the casing of the well.

2. The method according to claim 1, wherein the description of the zone behind the casing (92) is characterized by a quality of a fill-material disposed in an annulus (95) between the casing (92) and a formation.

3. The method according to claim 1,
a. wherein the first mode is a flexural mode;
b. wherein the second mode is a thickness mode.

4. The method according to claim 3 wherein:
a. the first measurement is a measurement of a propagation time;
b. the second measurement is a measurement of an amplitude decay rate with time.

5. The method according to claim 4 further comprising:
a. calculating a value of an impedance of a matter within the annulus and a value of a velocity of a compressional wave within the annulus from the measurement of the propagation time and the measurement of the amplitude decay rate;
b. evaluating a value of a density of the matter within the annulus from the calculated value of the acoustic impedance and the calculated value of the compressional wave velocity.

6. The method according to claim 4, further comprising:
a. selecting among the plurality of acoustic transducers an additional acoustic transducer for receiving (96b), the additional acoustic transducer for receiving (96b) being distinct from the first acoustic transducer for receiving (96a), the additional acoustic transducer for receiving (96b) having a location adapted to receive an additional echo corresponding to the first acoustic wave;
b. receiving at the additional acoustic transducer for receiving (96b) the additional echo and producing an additional signal;
c. extracting a measurement of a first amplitude from the first signal and a measurement of an additional amplitude from the additional signal.

7. The method according to claim 4, further comprising:
a. calculating a plurality of observed parameters at least from the measurement of the propagation time and the measurement of the amplitude decay rate.
b. defining a set of quality events of a matter within the annulus;
c. calculating for each quality event an a posteriori probability of the quality event for the calculated values of the observed parameters;
d. selecting a most probable quality event.

8. The method according to claim 7, further comprising:
a. estimating at least one quality parameter from the selected quality event and from the calculated values of the observed parameters.

9. The method according to claim 8, wherein:
a. the plurality of observed parameters comprises an impedance of the matter within the annulus (15, 38, 410, 95, 106) and a flexural wave attenuation of the first acoustic wave (A) along the casing (14, 24, 32, 44, 92, 103);
b. a plurality of quality parameters is estimated, the plurality of quality parameters comprising a density of the matter within the annulus (15, 38, 410, 95, 106), a shear wave velocity of the first acoustic wave through the matter and a compressional wave velocity of the first acoustic wave through the matter.

10. The method according to claim 1,
a. wherein the first mode is a flexural mode;
b. wherein the second mode is an extensional mode.

11. The method according to claim 1, further comprising:
a. insonifying the casing with a third acoustic wave using a third acoustic transducer for transmitting among the plurality of acoustic transducers, the third acoustic wave having a third mode, the third mode being distinct from the first mode and the second mode;
b. selecting a third acoustic transducer for receiving, the first transducer for receiving having a location adapted to receive a third echo corresponding to the third acoustic wave;
c. receiving at the third acoustic transducer the third echo and producing a third signal;
d. extracting from the third signal a third measurement;
e. evaluating from a combination of the first measurement, the second measurement and the third measurement the description of the zone behind the casing of the well.

12. The method according to claim 1, wherein: a. the fill-material is cement.

13. The method according to claim 1, further comprising:
a. guiding and rotating the logging tool inside the casing in order to evaluate the description of the zone behind the casing within a range of depths and azimuthal angles.

14. A system for imaging a description of a zone behind a easing (92) of a well, the system comprising:
a. a logging tool (97) positionable inside the casing (92) and carrying a plurality of acoustic transducers;
b. a first acoustic transducer for transmitting (93) among the plurality of acoustic transducers to insonify the casing (92) with a first acoustic wave having a first mode that may be any mode of a set of modes defined as follow: extensional mode, thickness mode, flexural mode;
c. a second acoustic transducer for transmitting (94) among the plurality of acoustic transducers to insonify the casing (92) with a second acoustic wave having a second mode that may be any mode of the set of modes and is distinct from the first mode;
d. at least a first acoustic transducer for receiving (96a) having a location adapted to receive a first echo corresponding to the first acoustic wave, to produce a first signal;
e. at least a second acoustic transducer for receiving (94) having a location adapted to receive a second echo corresponding to the second acoustic wave, to produce a second signal;
f. extracting means to extract a first measurement and a second measurement respectively from the first signal and the second signal; and
g. processing means to evaluate a quality of the description of the zone behind the casing (92) from a combination of the first measurement and the second measurement.

15. The system according to claim 14, wherein the description of the zone behind the casing (62) is characterized by a quality of a fill-material disposed in an annulus (95) between the casing (62) and a formation.

16. The system according to claim 14, wherein the first acoustic transducer for transmitting (93) and the first acoustic transducer for receiving (96a) are aligned at an angle larger than a shear wave critical angle of an interface (91) between the casing (92) and a fluid within the casing (92), the angle being measured with respect to a normal to the local interior wall of the casing (92).

17. The system according to claim 14, wherein
   a. the second acoustic transducer for transmitting (94) is directed to the normal to the local interior wall of the casing (92);
   b. the second acoustic transducer for transmitting (94) has a frequency spectrum selected to stimulate a selected radial segment of the casing (92) into a thickness resonance.

18. The system according to claim 14, further comprising:
   a. an additional acoustic transducer for receiving (96b) among the plurality of acoustic transducers, the additional acoustic transducer for receiving (96b) having a location adapted to receive an additional acoustic wave corresponding to the first acoustic wave, the additional acoustic transducer for receiving (96b) being distinct from the first acoustic transducer for receiving (96a), to produce an additional signal.

19. The system according to claim 14, further comprising:
   a. an array (101) of transducers elements located on a periphery of the logging tool, to insonify the casing (103) at least with the first acoustic wave and the second acoustic wave propagating within the casing (103) with respectively the first mode and the second mode.

20. The system according to claim 14, wherein the fill-material is cement.

\* \* \* \* \*